United States Patent [19]

Carrick et al.

[11] Patent Number: 5,260,077
[45] Date of Patent: Nov. 9, 1993

[54] VEGETABLE OIL COMPOSITIONS

[75] Inventors: Virginia A. Carrick, Munson; Richard Yodice, Willoughby, both of Ohio

[73] Assignee: The Lubrizol Corporation, Wickliffe, Ohio

[21] Appl. No.: 941,842

[22] Filed: Sep. 8, 1992

Related U.S. Application Data

[63] Continuation of Ser. No. 654,173, Feb. 12, 1991, abandoned.

[51] Int. Cl.$^5$ .............................................. A23D 9/06
[52] U.S. Cl. ...................................... 426/73; 426/544
[58] Field of Search ........................... 426/544, 601, 73

[56]  References Cited

U.S. PATENT DOCUMENTS

| | | | |
|---|---|---|---|
| 2,267,224 | 12/1941 | Taylor et al. | 99/163 |
| 2,316,854 | 12/1957 | Gross | 426/73 |
| 2,333,655 | 11/1943 | Mattill et al. | 99/163 |
| 2,333,656 | 11/1943 | Mattill et al. | 99/163 |
| 2,333,657 | 11/1943 | Mattill et al. | 99/163 |
| 2,349,277 | 5/1944 | Hickmar | 99/163 |
| 2,363,672 | 11/1944 | Jakobsen | 99/163 |
| 2,440,606 | 4/1948 | Hickman | 99/163 |
| 2,758,923 | 8/1956 | Wakely | 426/73 |
| 3,072,533 | 1/1963 | Johnson | 426/73 |
| 3,117,866 | 1/1964 | Golub et al. | 99/2 |
| 3,173,927 | 3/1965 | Nelan | 260/345.5 |
| 3,637,772 | 1/1972 | Klaui et al. | 260/398.5 |
| 3,852,502 | 4/1973 | Bishov | 426/544 |
| 4,627,192 | 12/1986 | Fick | 47/58 |
| 4,743,402 | 5/1988 | Fick | 260/412.2 |
| 4,948,811 | 8/1990 | Spinner et al. | 514/560 |
| 5,077,069 | 12/1991 | Chang | 426/330.6 |

FOREIGN PATENT DOCUMENTS 0323753 12/1988 European Pat. Off. .
2202726 10/1988 United Kingdom .................. 426/73

OTHER PUBLICATIONS

Jun. 1990 J. Food Science 55(5) 1464.
D. Swern 1979 Baileys Industrial Oil and Fat Products vol. 1, Fourth Edition.
Wiley Interscience Publication New York 382-387.

Primary Examiner—Carolyn Paden
Attorney, Agent, or Firm—James A. Cairns; Frederick D. Hunter; Forrest L. Collins

[57]  ABSTRACT

The present invention deals with stabilizing triglyceride oils of high oleic content through the use of tocopherol. This combination of the high oleic oil and the tocopherol results in a surprisingly stable composition for use in deep frying.

44 Claims, 4 Drawing Sheets

FIG. 4

| % Oleic | AOM | AOM with tocopherol | % Increase in AOM |
|---|---|---|---|
| 81.8 | 38.8 | 86.5 | 123 |
| 78.6 | 33.0 | 72.0 | 118.0 |
| 77.4 | 30.0 | 68.0 | 127.0 |
| 45.3 | 20.3 | 21.6 | 6.4 |
| 67.3 | 23.0 | 35.0 | 52.0 |
| 78.9 | 36.5 | 77.0 | 111.0 |
| 78.6 | 40.0 | 66.0 | 65.0 |
| 83.8 | 48.0 | 108.0 | 125.0 |
| 85.3 | 58.0 | 135.0 | 133.0 |
| 84.8 | 57.0 | 135.0 | 137.0 |
| 87.2 | 85.0 | 176.0 | 107.0 |

FIG. 5

| PPM ADDED TOCOPHEROL | GAMMA TOCOPHEROL AOM VALUE | ALPHA TOCOPHEROL AOM VALUE |
|---|---|---|
| 0 | 40 | 39 |
| 100 | 50 | 42 |
| 500 | 67 | 48 |
| 1000 | 68 | 51 |
| 2000 | 66 | 48 |

VEGETABLE OIL COMPOSITIONS

This is a continuation of copending application Ser. No. 07/654,173 filed on Feb. 12, 1991, abandoned.

BACKGROUND OF THE INVENTION

1. Field of the Invention

The present invention relates to vegetable oil compositions and in particular to those vegetable oil compositions which are edible.

2. Introduction to the Invention

The present invention deals with a manner of stabilizing vegetable oils against oxidation. The invention in particularly deals with high oleic oils which are believed to be more healthy for the diet. In particular, high oleic content vegetable oils are believed to reduce low density lipoprotein cholesterol. Low density lipoprotein cholesterol has been referred in the literature as "bad cholesterol" which is that believed responsible for plaque buildup on the walls of blood vessels.

The use of high oleic vegetable oils has been of further interest in the diet in recent years in that it is also believed that a high saturated fat content in the diet may also lead to the formation of plaque. Thus the present invention provides a benefit in giving an oxidatively stable oil in which two distinct mechanisms are believed to reduce cholesterol.

It is noted that saturated fats are more stable than unsaturated fats because of the absence of a double bond in saturated fats. Of course, as the oils of the present invention are high in oleic content they correspondingly contain a high degree of mono-unsaturation in the oil.

The higher the degree of unsaturation in an oil the more likely that the oil will go rancid (oxidize). It is particularly critical in dietary oils which are used for frying, such as French frying, that the oil be stable for a long period of time. Many fast food manufacturers have utilized saturated fats, and in particular saturated animal fats, because of their ability to withstand long periods of time at elevated temperatures in the manufacture of fried foods. Of course, as the fried food absorbs the saturated fat such is taken into the human diet. Thus while a saturated fat may be oxidatively stable for frying it is unfortunate that a dietary component with the problems previously addressed are encountered.

Many antioxidants present problems especially when used at high levels in industrial applications. The tocopherol antioxidants are environmentally friendly and compliment the natural oils described herein.

Thus it remains to develop a vegetable oil which is high in oleic acid content, and low in saturates or polyunsaturated oils which is oxidatively stable and which may be utilized for deep frying. Other uses of oils include crankcase, gear lubricants, transmission oils, tractor oils and hydraulic fluids.

It is known from U.S. Pat. No. 2,267,224 issued Dec. 23, 1941 to Taylor et al that lard shortening may be stabilized through the use of tocopherol at levels of 0.02% to 0.06%. The present invention does not deal with lard which contains large amounts of cholesterol (which should be avoided in the diet), and the oil of the invention does not contain the high degree of saturates or linoleic acid moieties which are found in lard. It is further noted that the compositions of Taylor et al are suggested for use in hydrogenated lard. In fact it is noted that the tocopherol is also hydrogenated in Taylor et al.

Hickman in U.S. Pat. No. 2,349,277 issued May 23, 1944 suggests a method of preparing a deodorized relatively stable edible triglyceride. Jacobsen in U.S. Pat. No. 2,363,672 issued Nov. 7, 1941 suggests that animal and vegetable shortenings may be treated by adding a tocopherol-containing deodorizer sludge to shortening and hydrogenating the resultant mixture.

U.S. Pat. No. 2,440,606 issued Apr. 27, 1948 to Hickman suggests methods for obtaining tocopherol or vitamin E produced during the vacuum-inert gas deodorization treatment of vegetable or animal oils. Mattill et al in U.S. Pat. No. 2,333,655 issued Nov. 9, 1943 describes obtaining the use of beta-tocopherol in lard. Similar disclosures are also found in U.S. Pat. Nos. 2,333,656 and 2,333,657 both issued to Mattill et al on Nov. 9, 1943.

Golub in U.S. Pat. No. 3,117,866 issued Jan. 14, 1964 discusses the use of phosphatides, oils, and tocopherol at levels of 0.25% to 2% in an oleaginous composition. Klaui et al in U.S. Pat. No. 3,637,772 issued Jan. 25, 1972 suggests the use of tocopherols in combination with colamine or its salt, and a higher fatty acid ester of ascorbic acid. Nelan in U.S. Pat. No. 3,173,927 issued Mar. 16, 1975 discusses various methods for obtaining tocopherol.

High oleic vegetable oils with which the present is concerned may be obtained from any one of several sources. The first and most important source of high oleic acid content vegetable oils are described in Fick's U.S. Pat. Nos. 4,627,192 and 4,743,402 issued respectively Dec. 9, 1986 and May 10, 1988. The Fick patents describe obtaining in large quantities high oleic vegetable oils having greater than 80% oleic acid. The Fick oils are also noted for their high degree of stability with regard to the AOM values as hereinafter described.

It is also known from European Patent Application 88 312397.8 filed Dec. 29, 1988 that high oleic content rapeseed (canola) may be used as a source of a high oleic content vegetable oil. Low saturated fat content oils are described in U.S. Pat. No. 4,948,811 issued Aug. 14, 1990 to Spinner et al.

The vegetable oil products of the present invention provide highly stable oils for cooking which have the desirable benefits of low saturate and low linoleic acid levels while maintaining a relatively high degree of mono-unsaturate in the oil.

To the extent that any of the foregoing references are applicable they are herein explicitly incorporated by reference. Temperatures and pressures given herein are in degrees C and KPa absolute unless otherwise indicated. When discussing the fatty acid content of a triglyceride oil such relates to the average molar amount of the fatty acid species which make up the triglyceride. Ranges and ratios given herein may be combined.

SUMMARY OF THE INVENTION

The present invention describes a natural vegetable oil composition comprising triglycerides wherein at least about 70% of the fatty acid moieties in the triglyceride are oleic; less than about 20% of the fatty acid moieties in the triglyceride are linoleic, and further comprising at least about 100 ppm of a tocopherol based on the weight of the triglyceride.

A further embodiment of the present invention is a triglyceride composition wherein at least about 83% of the fatty acid moieties in the triglyceride are oleic and further including in said composition about 500 to about 3,000 ppm of tocopherol per part of triglyceride.

Yet a further embodiment of the present invention is a vegetable composition comprising triglycerides wherein at least about 70% of the fatty acid moieties in the triglyceride are oleic; less than about 20% of the fatty acid moieties in the triglyceride are linoleic, and further comprising an antioxidant effective amount of a tocopherol.

A still further useful composition herein is a triglyceride composition wherein at least about 83% of the fatty acid moieties in the triglyceride are oleic and further including in said composition about 500 to about 3,000 ppm of tocopherol per part of triglyceride.

The present invention also involves a method for stabilizing an oil utilized in deep frying comprising adding to a triglyceride wherein at least about 70% of the fatty acid moieties in the triglyceride are oleic; less than about 20% of the fatty acid moieties in the triglyceride are linoleic, and further comprising about 100 to about 3,500 ppm of a tocopherol based on the weight of the triglyceride.

The invention also describes an edible oil composition comprising an oleic acid content of at least 70% of the fatty acid moieties and tocopherol wherein the AOM of the composition is at least 100.

DETAILED DESCRIPTION OF THE INVENTION

When discussing an oil herein the chemical make-up of the oil is a triglyceride, e.g. three moles of a fatty acid esterifying one mole of glycerine. Thus when discussing the acid content of the oil it is this portion of the triglyceride which is discussed not the free acid or other esters containing the acid species. A natural oil as described herein is a non-hydrogenated oil obtained from plants.

The first aspect to be discussed in the present invention is the vegetable oil. It is first noted that Fick U.S. Pat. Nos. 4,627,192 and 4,743,402 discuss obtaining high oleic content sunflower oils. The sunflower oils useful herein typically contain an oleic acid content of greater than 70% of the fatty acid moieties on average in the oil. Stated otherwise, each of the three fatty acids that make up the triglyceride are on average at least 70% oleic.

Preferably, the oleic acid content of the triglyceride is greater than 78%, most preferably greater than 80%, yet more preferably greater than 85% and most preferably greater than 87%.

The remainder of the fatty acid composition in the triglycerides is typically less than 10% linoleic acid, most preferably less than 5%, and more preferably less than 3% by weight linoleic. Most preferably the linoleic content is less than 2% or 1%. Similarly, other higher unsaturated acids such as linolenic are also present in substantially lower amounts than the linoleic acid content.

The saturated fatty acid content of the oil is typically less than 15%, typically less than 10%, preferably less than 7%, and most preferably less than 3% by weight.

It is also preferred that the oils utilized herein contain at least 85% of the fatty acid species as C18, preferably 90% and most 92% by weight of 18 carbon species. It is noted that the total number of carbon atoms carboxylic acid portion of the oil is included in the foregoing definition.

The oils which may be utilized with the present invention as previously noted include sunflower, rape or canola as described in published European Patent 88 312397.8. In fact any vegetable oil may be utilized including peanut, soya, corn, safflower, cottonseed, and the like. If desired, triolein might also be utilized as the source of an oil in the present invention. Triolein is a manufactured oil in which the oleic acid content of triglyceride is 100%.

The second component in the present invention is the tocopherol component. Various tocopherols are known in the present invention. Tocopherols are a member of the family of chroman compounds. The various tocopherols which are known and described in the Merck Index 8th edition includes alpha (including d,1-alpha), beta, delta or gamma tocopherol. Numerous of the references previously cited herein show commercially available sources of natural occurring tocopherol.

It is also possible in the present invention to use synthetic tocopherol compounds. The synthetic tocopherol compounds are typically obtained by alkylating the ring structure to synthetically form a chroman compound. The primary difference between synthetic and natural tocopherols is that natural tocopherols have a substantial degree of optical rotation. The synthetic tocopherols due to their formation are optically balanced in both the dextro and levo forms. Thus the synthetic tocopherols do not exhibit optical rotation.

There is some difference in the biological activity of the various tocopherols and as well of natural tocopherols over synthetic tocopherols. However, for the present invention the differences in biological activity are not controlling in the choice of which tocopherol to utilize as an antioxidant in the claimed compositions.

The amount of the tocopherol utilized in the present invention is typically from about 100 to 3,500 ppm of tocopherol based on the weight of the triglyceride. A preferred range for the use of the tocopherol in the present invention is at from 300 to 2,500 ppm. A more preferable range for the use of the tocopherol in the present invention is from 500 to 2,000 ppm.

It is preferred that the triglyceride herein not be hydrogenated, and accordingly, that the oil not have any trans unsaturation in the oil.

It is further noted herein that the tocopherol may be utilized in its free form or as an acceptable salt or ester. Typically, when the tocopherol is utilized as a salt it is present as an ester such as the acetate or succinate form. The use of the salts of tocopherol are typically for the convenience of the manufacturer of the tocopherol. The amount of tocopherol utilized herein is specified as the free-form of the tocopherol.

The tocopherol may be also utilized as various mixtures of alpha, beta and delta tocopherol. A further variation of the present invention is the use of the tocopherol in a mixture of the alpha and gamma forms. It is further suggested herein that the tocopherol not be hydrogenated.

The oils of the present invention enjoy AOM's (active oxygen method) of greater than 50 hours, preferably greater than 60 hours, most preferably greater than 70 hours. The following table may be utilized to show the relationship of AOM, tocopherol content of a triglyceride mixture and the oleic acid content of the oil. The AOM is determined by AOCS procedure CD 12-57.

DESCRIPTION OF THE DRAWINGS

FIG. 4 shows the raw data used to obtain FIGS. 1 and 2.

FIG. 5 shows the raw data for FIG. 3.

EXAMPLE I

Figure 1:
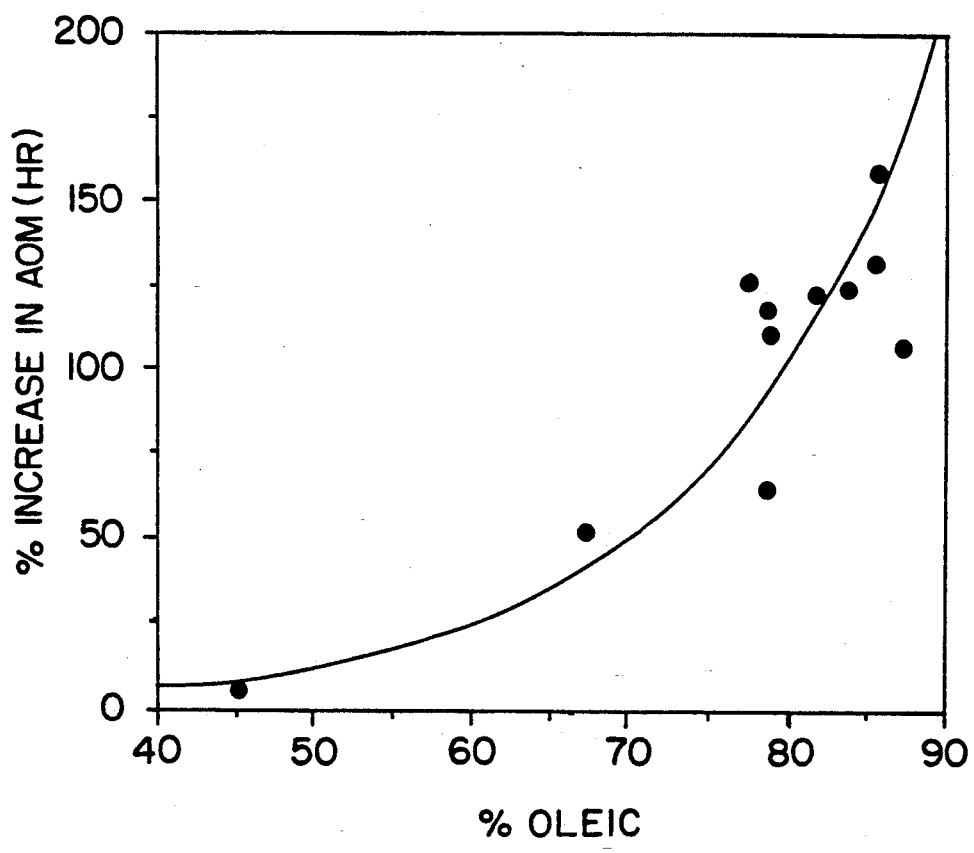
FIG. 1 shows the percentage of oleic acid in a vegetable oil on the x-axis and percent increase in AOM after using tocopherol at 2,000 ppm of the oil.
Figure 2:
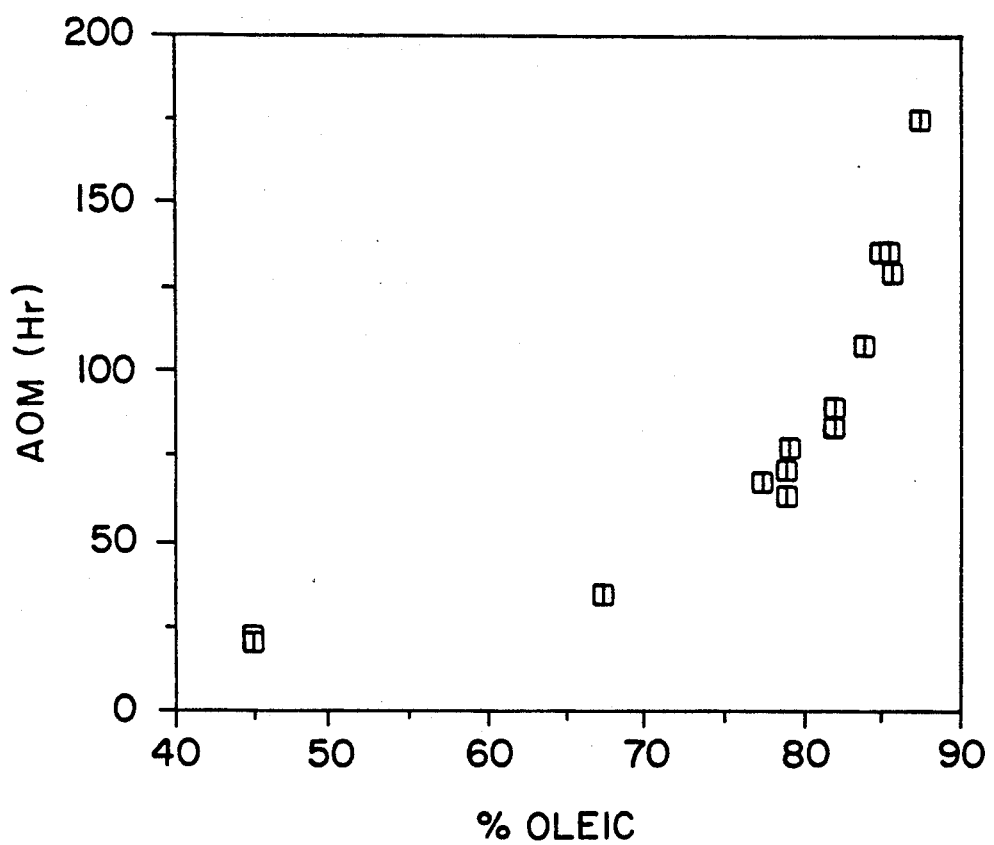
FIG. 2 shows the actual AOM versus the oleic content.
Figure 3:
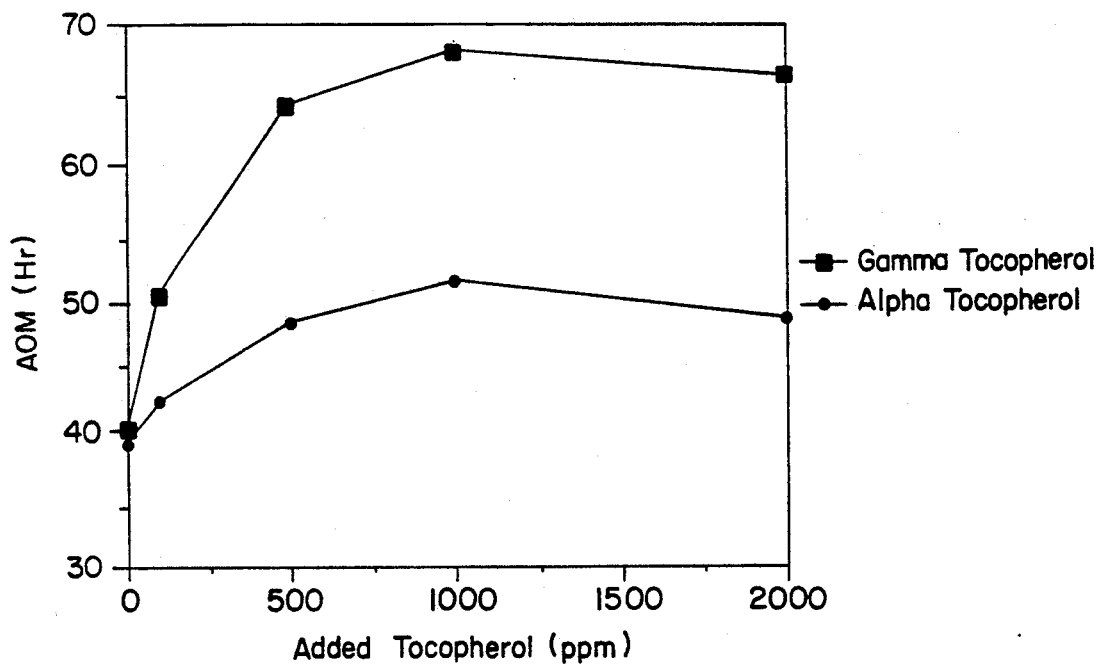
FIG. 3 shows 2 different types of tocopherol in an oil having an 80% oleic acid content of the triglyceride at varying tocopherol content.

The general method for obtaining the tocopherol treated oil is to stir the liquid oil and to add the tocopherol in the appropriate amount. The oil and tocopherol mixture are agitated. Generally, the oil is at 20° C. when mixing is accomplished.

The total mixing time depends on the respective volumes and the method of addition with, generally, 10 minutes to 1 hour sufficient to disperse the tocopherol in the oil.

What is claimed is:

1. A method of synergistically stabilizing an edible vegetable oil against oxidative degradation, said method comprising the step of adding, to an edible vegetable oil having an oleic content of at least about 80%, tocopherol in an amount of from about 300 to 3,500 ppm.

2. The method as defined by claim 1, wherein said edible vegetable oil is selected from the group consisting of sunflower oil, soya oil, corn oil, safflower oil, rapeseed oil, and mixtures thereof.

3. The method as defined by claim 2, wherein said edible vegetable oil is sunflower oil.

4. The method as defined by claim 1, wherein said edible vegetable oil has an oleic acid content of greater than 80%.

5. The method as defined by claim 4, wherein said edible vegetable oil has an oleic acid contend of greater than 85%.

6. The method as defined by claim 5, wherein said edible vegetable oil has an oleic acid content of greater than 87%.

7. The method as defined by claim 1, wherein said tocopherol is added in an amount of from about 300 to 2,500 ppm.

8. The method as defined by claim 7, wherein said tocopherol is added in an amount of from 500 to 2,000 ppm.

9. The method as defined by claim 1, wherein said tocopherol is a naturally occurring tocopherol.

10. The method as defined by claim 1, wherein said tocopherol is selected from the group consisting of gamma tocopherol, alpha tocopherol, d,1-alpha tocopherol, delta tocopherol, beta tocopherol, and mixtures thereof.

11. The method as defined by claim 10, wherein said tocopherol is present as a salt or ester.

12. The method as defined by claim 10, wherein said tocopherol is selected from the group consisting of gamma tocopherol, alpha tocopherol, d,1-alpha tocopherol, and combinations thereof.

13. The method as defined by claim 12, wherein said tocopherol is gamma tocopherol.

14. The method as defined by claim 1, further wherein said vegetable oil has a linoleic acid content of less than about 10%.

15. The method as defined by claim 14, wherein said linoleic acid content is less than about 5%.

16. The method as defined by claim 15, wherein said linoleic acid content is less than about 3%.

17. The method as defined by claim 1, further wherein said vegetable oil is substantially free of trans-unsaturated moieties.

18. The method as defined by claim 1, wherein said vegetable oil is non-hydrogenated.

19. A method of synergistically stabilizing an edible vegetable oil against oxidative degradation, said method comprising the step of adding 2,000 ppm of tocopherol to an edible vegetable oil having triglycerides with at least about 80% oleic fatty acid moieties and less than about 10% linoleic fatty acid moieties, whereby the Active Oxygen Method value for said edible vegetable oil is raised by at least about 111% compared to the Active Oxygen Method value for said edible vegetable oil in the absence of said tocopherol.

20. The method as defined by claim 19, wherein said edible vegetable oil has at least about 82% oleic fatty acid moieties and less than about 8% linoleic fatty acid moieties, whereby the Active Oxygen Method value for said edible vegetable oil is raised by at least about 123% compared to the Active Oxygen Method value for said edible vegetable oil in the absence of said tocopherol.

21. The method as defined by claim 20, wherein said edible vegetable oil has at least about 85% oleic fatty acid moieties and less than about 5% linoleic fatty acid moieties, whereby the Active Oxygen Method value for said edible vegetable oil is raised by at least about 133% compared to the Active Oxygen Method value for said edible vegetable oil in the absence of said tocopherol.

22. The method as defined by claim 21, wherein said Active Oxygen Method value is raised by at least about 137%.

23. An edible vegetable oil composition that is synergistically stabilized against oxidative degradation, said composition having been produced by a method comprising the step of adding 2,000 ppm of tocopherol to an edible vegetable oil having triglycerides with at least about 80% oleic fatty acid moieties and less than about 10% linoleic fatty acid moieties, said edible vegetable oil having an Active Oxygen Method that is raised by at least about 111% compared to the Active Oxygen Method value for said edible vegetable oil in the absence of said tocopherol.

24. The composition as defined by claim 23, wherein said edible vegetable oil has at least about 82% oleic fatty acid moieties and less than about 8% linoleic fatty acid moieties, said edible vegetable oil having an Active Oxygen Method that is raised by at least about 123% compared to the Active Oxygen Method value for said edible vegetable oil in the absence of said tocopherol.

25. The composition as defined by claim 24, wherein said edible vegetable oil has at least about 85% oleic fatty moieties and less than about 5% linoleic fatty acid moieties, said edible vegetable oil having an Active Oxygen Method that is raised by at least about 133% compared to the Active Oxygen Method value for said edible vegetable oil in the absence of said tocopherol.

26. The composition as defined by claim 25, wherein said Active Oxygen Method value is raised by at least about 137%.

27. An edible vegetable oil composition that is synergistically stabilized against oxidative degradation, said composition having been produced by a method comprising the step of adding, to an edible vegetable oil having an oleic acid content of at least about 80%, tocopherol in an amount of from about 300 to about 3,500 ppm.

28. The composition as defined by claim 27, wherein said edible vegetable oil is selected from the group consisting of sunflower oil, soya oil, corn oil, safflower oil, rapeseed oil, and mixtures thereof.

29. The composition as defined by claim 28, wherein said edible vegetable oil is sunflower oil.

30. The composition as defined by claim 29, wherein said edible vegetable oil has an oleic acid content of greater than 80%.

31. The composition as defined by claim 30, wherein said edible vegetable oil has an oleic acid content of greater than 85%.

32. The composition as defined by claim 31, wherein said edible vegetable oil has an oleic acid content of greater than 87%.

33. The composition as defined by claim 27, wherein said tocopherol is added in an amount of from about 300 to 2,500 ppm.

34. The composition as defined by claim 33, wherein said tocopherol is added in an amount of from 500 to 2,000 ppm.

35. The composition as defined by claim 27, wherein said tocopherol is a naturally occurring tocopherol.

36. The composition as defined by claim 27, wherein said tocopherol is selected from the group consisting of gamma tocopherol, alpha tocopherol, d,1-alpha tocopherol, delta tocopherol, beta tocopherol, and mixtures thereof.

37. The composition as defined by claim 36, wherein said tocopherol is present as a salt or ester.

38. The composition as defined by claim 36, wherein said tocopherol is selected from the group consisting of gamma tocopherol, alpha tocopherol, d,1-alpha tocopherol, and combinations thereof.

39. The composition as defined by claim 38, wherein said tocopherol is gamma tocopherol.

40. The composition as defined by claim 27, further wherein said vegetable oil has a linoleic acid content of less than about 10%.

41. The composition as defined by claim 40, wherein said linoleic acid content is less than about 5%.

42. The composition as defined by claim 41, wherein said linoleic acid content is less than about 3%.

43. The composition as defined by claim 27, further wherein said vegetable oil is substantially free of trans-unsaturated moieties.

44. The composition as defined by claim 27, wherein said vegetable oil is non-hydrogenated.

* * * * *